US00RE38016E

(19) United States
(12) Reissued Patent
Gueret

(10) Patent Number: US RE38,016 E
(45) Date of Reissued Patent: Mar. 4, 2003

(54) APPLICATION UNIT FOR A LIPSTICK-TYPE PRODUCT

(75) Inventor: Jean-Louis H. Gueret, Paris (FR)

(73) Assignee: L'Oreal, Paris (FR)

(21) Appl. No.: 09/837,732

(22) Filed: Apr. 19, 2001

Related U.S. Patent Documents

Reissue of:
(64) Patent No.: 5,895,162
Issued: Apr. 20, 1999
Appl. No.: 09/016,735
Filed: Jan. 30, 1998

(30) Foreign Application Priority Data

Feb. 13, 1997 (FR) ..... 97 01683

(51) Int. Cl.[7] ..... A45D 40/00; A45D 40/24
(52) U.S. Cl. ..... 401/125; 401/118; 401/119; 401/123
(58) Field of Search ..... 401/118, 119, 401/123–125, 191

(56) References Cited

U.S. PATENT DOCUMENTS

| | | | | |
|---|---|---|---|---|
| 545,949 | A | | 9/1895 | Dodge |
| 711,678 | A | * | 10/1902 | Ritz |
| 711,679 | A | * | 10/1902 | Ritz |
| 1,193,433 | A | | 8/1916 | Searcy |
| 2,620,499 | A | | 12/1952 | Dressel |
| 2,796,875 | A | * | 6/1957 | Anastasia |
| 3,480,371 | A | * | 11/1969 | Lee |
| 4,726,387 | A | * | 2/1988 | Sarica |
| 4,854,759 | A | | 8/1989 | Morane et al. |
| 5,002,415 | A | * | 3/1991 | Gueret |
| 5,492,426 | A | | 2/1996 | Gueret |
| 5,636,931 | A | | 6/1997 | Gueret |
| 5,890,828 | A | | 4/1999 | Gueret |

FOREIGN PATENT DOCUMENTS

| | | |
|---|---|---|
| DE | 4 335 633 | 10/1994 |
| DE | 4 434 793 A1 | 4/1996 |
| EP | 0 380 182 A1 | 8/1990 |
| EP | 0 612 488 A1 | 8/1994 |
| EP | 0 667 301 A1 | 8/1995 |
| EP | 0 688 516 A1 | 12/1995 |
| FR | 742 193 | 3/1933 |
| FR | 985 395 | 7/1951 |
| GB | 274 880 | 11/1927 |
| GB | 1 521 173 | 8/1978 |
| JP | 60-17276 | 2/1985 |
| JP | 64-34466 | 2/1989 |
| JP | 6-296520 | 10/1994 |
| JP | 8-140733 | 6/1996 |
| JP | 8-1515 | 10/1996 |

OTHER PUBLICATIONS

English Language Abstract of EPO 0380 182 A1.
English Language Abstract of EPO 0 612 488 A1.
English Language Abstract of EPO 0 667 301 A1.
English Language Abstract of EPO 0 688 516 A1.
English Language Abstract of DE 4 434 793 A1.

* cited by examiner

*Primary Examiner*—Charles R. Eloshway
(74) *Attorney, Agent, or Firm*—Finnegan, Henderson, Farabow, Garrett & Dunner, L.L.P.

(57) ABSTRACT

An application unit (1) includes a first compartment (4) intended to form a housing for an application (6) containing a product capable of solubilizing or gelling on its surface in contact with a liquid composition, and mounted in a detachable manner in the first compartment (4) through a first opening (11); and a second compartment (5) separated from the first compartment and including an element (14) impregnated with the liquid composition, and capable of restoring a quantity of the liquid composition to the applicator (6) when the applicator is introduced into the second compartment (5) through a second opening (18) and caused to bear on a restoring surface (50) of the element (14). A detachable closure (3, 8, 9, 20) is provided for respectively obturating the first opening (11) and the second opening (18).

75 Claims, 4 Drawing Sheets

APPLICATION UNIT FOR A LIPSTICK-TYPE PRODUCT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an application unit that can be used, in particular, in the fields of pharmacy, cosmetics, dermatology, hair care, etc. The invention concerns more particularly a device of the type comprising a solid or semi-solid applicator which must be brought into contact with a liquid composition before its application, and which is capable of solubilizing or gelling on its surface on contact with the liquid composition. By way of example, this may be a lipstick that is but slightly friable and whose surface must be brought into contact with water, for example, in order to soften its surface and to promote the exfoliation of the lip rouge. Again by way of example, the applicator may be of the "styptic pencil" type for cauterizing sores. In this latter application, the applicator contains hydrosoluble active substances, such as mixed sulphates of aluminium and ammonium, which are solubilized in the presence of a liquid composition such as water. The invention also applies to the application of a product which may have a cosmetic effect and a treatment effect, the cosmetic effect being produced by the applicator itself, the treatment effect being obtained by a liquid solution with which the applicator is brought into contact. By way of example, this concerns a lipstick that is brought into contact with a film-forming agent or with a treatment composition of the anti-chapping type. It may also be a stearate soap of ammonium or potassium, or a tensioning stick, for example of polyvinyl alcohol (PVA) capable of effacing wrinkles, or of guar gum. It may also be a compound, such as an emollient, which cannot be introduced into the stick during its manufacture. In general, the invention relates to any friable solid or semi-solid applicator which, before its application to a surface to be treated, has to be brought into contact with a liquid composition permitting its exfoliation, and/or containing active agents that cannot be introduced into the applicator.

2. Description of the Related Art

EP-A-612 488 describes an applicator comprising a reservoir containing a product to be applied, a cap intended to close the reservoir, and an applicator holder supporting a deformable element made of foam or an elastomer of low hardness for the application of the product. The deformable element carries asperities on its surface and is provided with a good (large) shape memory. The product reservoir is delimited by a capillary end fitting, in the form of a glove finger having a bottom that is provided with a seat pierced by at least one capillary opening, against which the deformable element is applied and deformed in the position when the reservoir is closed by the cap.

In the field of lipsticks there exist, moreover, liquid formulas containing polymers, which have the advantage of a long hold on the lips, but which are, in a galenical form, a long way from the established usage of the conventional stick.

SUMMARY OF THE INVENTION

Thus one of the objects of the present invention is to provide an application unit containing both a friable solid or semi-solid applicator and a liquid composition necessary for its exfoliation and/or containing active agents which have to be brought into contact with the applicator with a view to a combined action. Other objects of the invention will become apparent from the description that follows.

In accordance with the invention, these objects are attained by means of an application unit comprising a first compartment intended to form a housing for an applicator containing a product capable of solubilizing or gelling on its surface in contact with a liquid composition, and mounted in a detachable manner in the first compartment through a first opening; a second compartment separated from the first compartment and comprising an element impregnated with the liquid composition and capable of restoring a quantity of the liquid composition to the applicator when the applicator is introduced into the second compartment through a second opening and caused to bear on a restoring surface of the element, the element forming a stopper so as to prevent any flow of the liquid composition through the second opening; and detachable closing means for respectively obturating the first and second openings. The element contained in the second compartment thus acts as a "sequestering" agent which retains the liquid to prevent it from flowing by gravity through the second opening, but which restores it to the applicator when the applicator is caused to bear on the element.

The impregnated element may be formed by a block of foam with open cells or half-open cells, or an element forming a wick of the felt type, or a sintered element, or an elastomer of low hardness with open cells or half-open cells, or a combination of such elements. An elastomer of low hardness is understood to mean an elastomer whose hardness is in the range from 15 Shore A to 70 Shore A. Advantageously, the restoring surface of the element is covered by a flocked coating, or by a perforated film of a thermoplastic elastomer, or by a plastic, or by a layer of felt, or by a textile fabric. This last characteristic makes it possible, inter alia, to adjust the quantity of the liquid transferred to the applicator by substantially modifying the restoring capacity of the impregnated element towards the applicator, and/or modifying the abrasiveness of the restoring surface.

The liquid composition may be dosed so as to be contained substantially wholly inside the element. This diminishes the risk of inopportune outflows of the product while ensuring an adequate self-sufficiency for the device.

According to one embodiment, the element has a first end in the vicinity of the second opening, and a second end on the opposite side to the first, the element having, at least at its first end, a cross-section substantially identical with the internal cross-section of the second compartment. This makes it possible to isolate the opening from any liquid that may be at the bottom of the reservoir. Moreover, in case the impregnated element is an elastically deformable element, it is axially guided in the compartment when the applicator is caused to bear on its upper surface. Causing the applicator to bear on such an elastically deformable element with open cells or half-open cells, followed by the extraction of the applicator, firstly produces an at least partial compression of the open cells or half-open cells, then the decompression of the cells, which causes the liquid to be drawn up towards the restoring surface of the impregnated element.

The second end of the element containing the liquid composition may be substantially in contact with the bottom. Advantageously, the second compartment defines, all around the element in the vicinity of the bottom, an annular space defining a volume capable of containing a reserve of the liquid composition for feeding the element, the element being capable of drawing up the liquid composition from the reserve.

Alternatively, the second end is situated in a fixed intermediate position between the bottom and the second opening so as to define, between the bottom and the second end, a volume capable of containing a reserve of the liquid composition for feeding the element, the element being capable of drawing up the liquid composition from the reserve. Bringing the liquid contained in the reserve into contact with the element, in particular, is effected by completely or partially upending the application unit. This is produced quite naturally, in particular while such a packaging unit is being carried in the user's handbag. Alternatively, a wick-type element may be provided which dips into the reserve of the liquid which rises up by virtue of the capillarity drawing phenomenon.

The applicator may be a styptic pencil, or a stick of lipstick, of a make-up foundation, of polyvinyl alcohol (PVA), of guar gum, or ok a skin treatment product. The liquid composition may contain water or any other solvent, and/or preservatives, and/or film-forming elements and/or emollients, and/or active compounds.

The application unit in accordance with the invention may comprise means for allowing the second compartment to be detachably mounted relative to the first. This allows the applicator and the container containing the liquid composition to be sold separately, if desired. It also makes it possible to allow the same stick to be used in combination with several liquid compositions according to the user's requirements.

According to a particular embodiment, the two compartments are disposed head-to-tail and aligned along the same axis and disposed so that the first and second openings are situated in directions opposite to one another. This arrangement reduces the size and allows a unit to be made of a shape similar to that of conventional sticks.

The second compartment may have an auxiliary opening for mounting the impregnated element inside the second element, or for replacing it after the liquid composition contained therein has been used up. This auxiliary opening may also be used for adding liquid to the second compartment, detachable means being provided for obturating the auxiliary opening in a leakproof manner.

The applicator is preferably carried by a gripping element ensuring the leakproof closure of the first opening. For this purpose, the gripping element has a frustoconical portion capable of cooperating with a complementary profile of the first opening. This seal may be desirable for certain formulas. On the other hand, for other formulas it may be arranged that the applicator is not contained in a leakproof manner inside the first compartment, so as to permit the evaporation of certain kinds of substances and, if applicable, to permit the drying out of the formula. A cover cap may optionally be disposed on the unit in a detachable manner.

The gripping element advantageously has means for limiting the insertion of the applicator into the second compartment. By way of example, a shoulder may be formed at the level of the gripping element. This makes it possible to restrict the force that can be exerted on the foam block. An excessive force could be detrimental both to the applicator and the element impregnated with the liquid composition. However, the travel of the applicator, the position of the foam block and its height must be chosen so as to be sufficient for the applicator to be brought to bear on the foam block irrespective of the extent to which the product for the applicator has been consumed.

The applicator is preferably disposed in a cup carried by the gripping element, the applicator being formed by molding or extrusion.

The second opening is obturated in a leakproof manner by means of a lip or a frustoconical element which is carried by a detachable cap, and which is capable of cooperating with a complementary profile of the second opening. The detachable cap may be designed so as to obturate only the second opening. Advantageously, it forms a single part with the cover cap disposed on the applicator opposite the first compartment.

A sealing element in the form of an annular piece made of an elastomeric material may be disposed inside the second opening, so as to perfect the seal of the closure of the second compartment. Advantageously, the sealing element is disposed so as to limit the axial movement of the impregnated element, to prevent the emergence of the element through the second opening.

The applicator may have any cross-section. For example, it may have a cross-section which is circular, triangular, square, oval, elliptical, etc. The internal cross-section of the second compartment is matched to the shape of the applicator.

BRIEF DESCRIPTION OF THE DRAWINGS

Apart from the arrangements set out above, the invention consists of a certain number of other arrangements which will be explained below with regard to non-restrictive examples of the embodiment, described with reference to the attached drawings, wherein.

DETAILED DESCRIPTION OF THE PREFERRED EMBODIMENTS

Figure 1A:
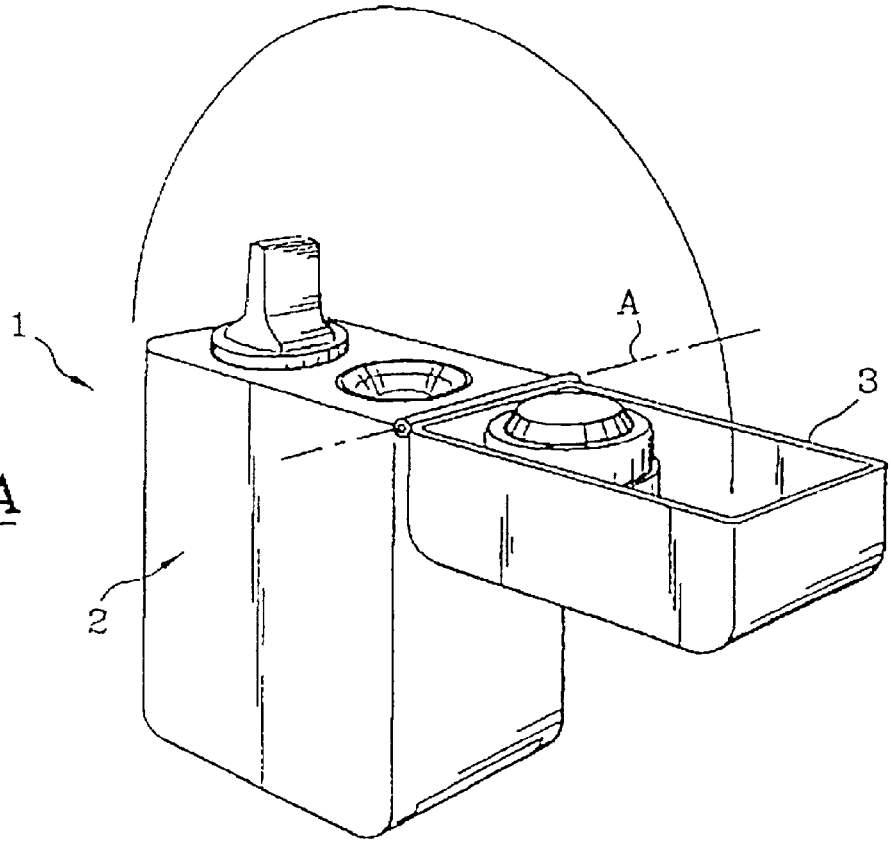
FIGS. 1A–1C illustrate a first embodiment of the application unit in accordance with the invention.
Figure 1B:
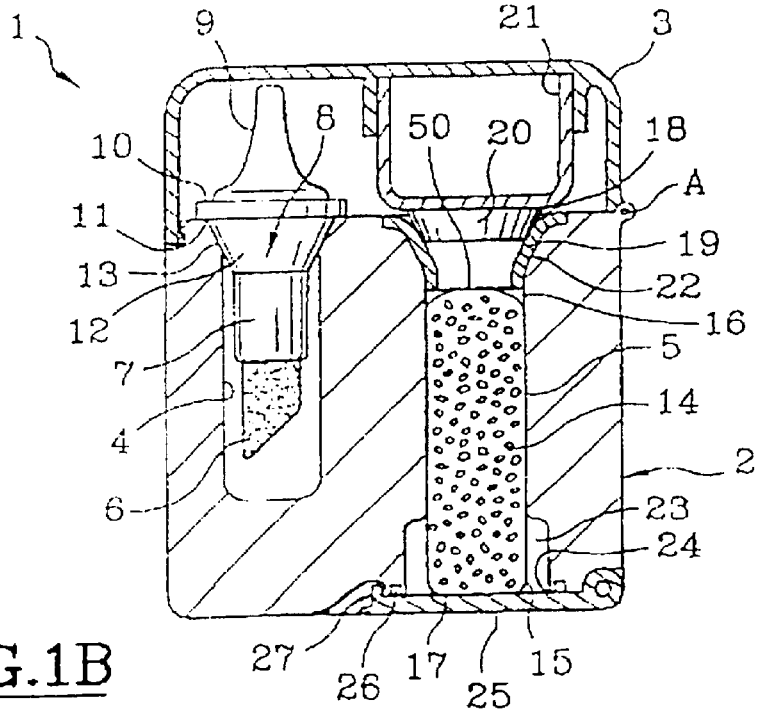
Figure 1C:
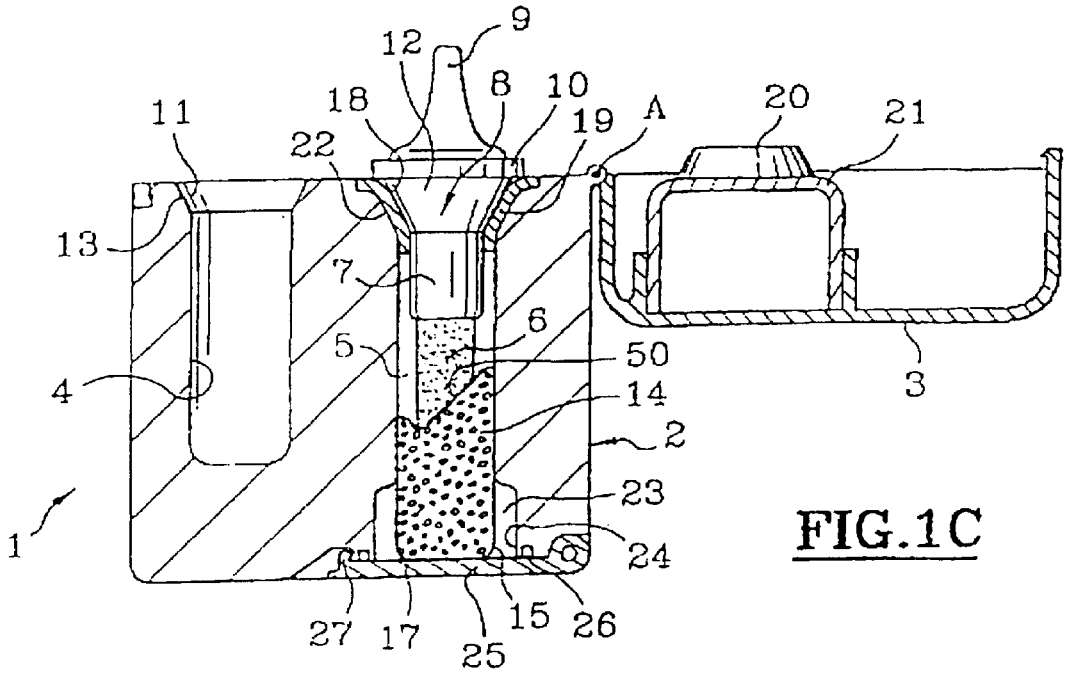

FIGS. 1A to 1C, to which reference will now be made, illustrate a first embodiment of the device 1 in accordance with the invention. As shown in perspective in FIG. 1A, this takes the form of a case 2 of a generally parallelepiped shape, closed by a lid 3 articulated around a hinge pin A. Such a case may be made by molding one or several thermoplastic materials compatible with the products contained therein. By way of example, one may use polyethylenes, polypropylenes, polystyrenes, polyvinyl chlorides etc.

As shown in greater detail in the sectional view of FIG. 1B, the body of the case defines two compartments 4 and 5 separated from one another. The first compartment is intended to contain an applicator 6 (shown in the form of a stick, for example a lipstick) mounted inside a cup 7 carried by an element 8 whose upper portion forms a gripping element 9. Typically such an applicator 6 contains a product packaged in the form of a solid or semi-solid stick. The product is capable of solubilizing or gelling on its surface in contact with an appropriate liquid composition with a view to its exfoliation, for example on the skin. Preferably, this product is one which is non-friable or only very slightly friable in its dry state, but which becomes friable on its surface when placed into contact with a liquid composition.

Preferably, the product does not absorb or draw up the liquid in depth, so that the solubilization or gelling occurs solely on its surface. Such a stick may be obtained by molding or extrusion and is held in position in the cup by bonding or by means of striations arranged on the internal surface of the cup.

The element 8 forms a shoulder 10 bearing on a side of the case delimiting an opening 11. Advantageously, the element 8 has a frustoconical portion 12 capable of cooperating with a frustoconical profile 13 formed within the opening 11. When the applicator is disposed inside the compartment 4, this makes it possible to obturate the opening 11 in a leakproof manner, so as to prevent substantially any evaporation of the solvent entering into the composition of the stick 6. However, for certain formulas, it may be desirable to have a non-leakproof closure so as to allow the stick 6 to dry.

The case 2 also forms a second compartment 5 wherein there is disposed a block 14 of foam with open cells or semi-open cells, with a cross-section substantially equal to the cross-section of the compartment 5. According to this embodiment, the foam block has, in the non-compressed (or only slightly compressed) position, a height substantially identical to the height of the compartment. In fact, a first end 15 is in contact with the bottom 17. The other end is situated substantially in the vicinity of the opening 18 abutting against an annular element 19 disposed inside the opening 18. Advantageously, the annular element 19 is made of an elastomeric material and forms a gasket ensuring the tightness of the seal of the compartment 5. The seal of the compartment is obtained by a part 20 carried by an element 21 joined to the lid 3. The part 20 has a frustoconical shape and is capable of cooperating with a frustoconical profile 22 formed inside the opening 18. This improves the seal of the compartment 5.

As illustrated in this embodiment, the lid 3 carries means allowing the opening 18 of the compartment 5 to be obturated, and is of sufficient size to cover the whole of the case 2, thus forming a cover cap over the applicator 6. Furrow/groove-type means allow the lid 3 to be kept in the closed position on the case.

The foam block 14 is impregnated with a liquid composition such as water or any other solvent and/or preservatives, and/or film-forming elements, and/or emollients, and/or active compounds. According to one embodiment, the volume of liquid is chosen so as to be contained entirely within the foam block. Alternatively, in the vicinity of its bottom 17 the compartment 5 has a portion with a diameter 23 larger than the diameter of the foam block. This makes it possible to obtain, in the vicinity of the bottom, a reserve of the liquid composition which will be drawn up by the foam block 14 in the course of use. The larger diameter portion in the vicinity of the bottom also makes it possible to facilitate the removal and/or insertion of the foam block 14 during its initial mounting or during its replacement when all its contents have been used up. For this purpose, an opening 24 is arranged in the bottom 17 and is obturated by a lid 25 articulated on the bottom of the case 2. A sealing 26, disposed between the bottom and the lid 25 ensures fluid tightness. The lid 25 is kept in the closed position by a conventional catch 27.

The foam block 14 only constitutes one preferred embodiment. Alternatively, one may use an element forming a wick of the felt type, or a sintered element, or an elastomer of a low hardness with open cells or half-open cells, or a combination of such elements. In general, in accordance with the invention it is possible to use any material capable of drawing up liquid, or "sequestering" it (that is to say, retaining it in the absence of any strain) and of restoring it to a surface caused to bear on such a material. The free surface 50 of the impregnated element may be covered by a flocked coating, or by a perforated film of a thermoplastic elastomer, or by plastic, or by a layer of felt, or by a textile fabric (not shown).

Figure 2A:
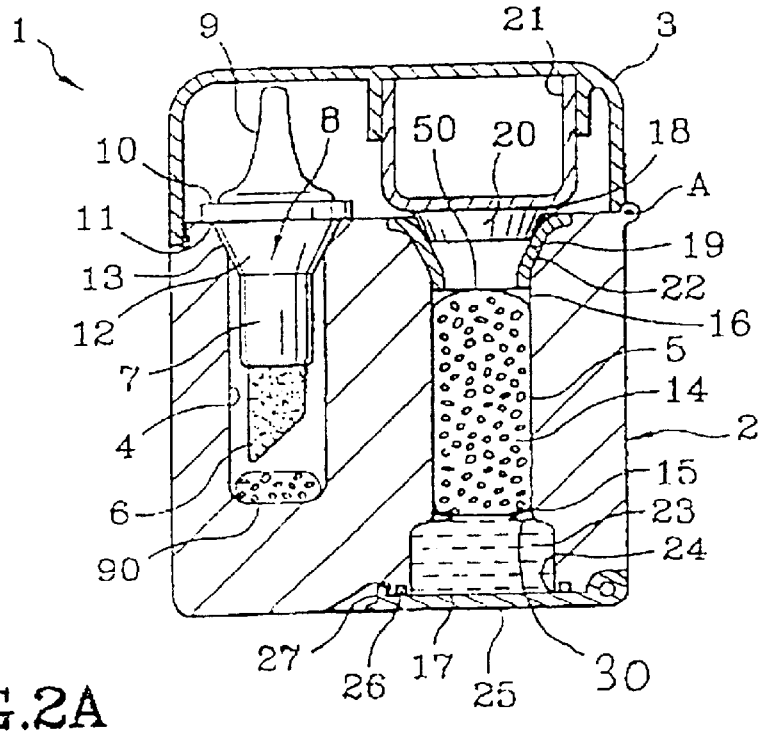
FIGS. 2A–2C illustrate variants of the embodiment of FIGS. 1A–1C, and FIGS. 3A–3B illustrate yet another embodiment of the application unit in accordance with the invention.

FIG. 1C illustrates the operation of the device in accordance with the invention. Having opened the lid 3, the user grips the applicator 6 by the gripping element 9, introduces the applicator into the second compartment 5 containing the foam block 14 and causes it to bear on the free surface 50 thereof. The foam is compressed to an extent depending on the depth of the insertion of the applicator. However, the insertion of the applicator 6 into the compartment 5 is axially limited by the shoulder 10 of the element 8 abutting on the edge of the opening 18. Thus, while bearing against the foam block impregnated with liquid, the surface of the applicator is solubilized or gelled on its surface and is optionally charged with active agents present in the liquid composition. The applicator can subsequently be applied to the surface to be treated where it can exfoliate on its surface. The foam block 14 reassumes its original shape in the compartment 5 by drawing up liquid towards the upper surface thereof In the embodiment of FIG. 2A, the foam block 14 does not descend as far as the bottom of the reservoir. Its lower end is kept in an axially intermediate position between the bottom 17 and the opening 18 by means of a collar 30. Thus a reservoir of liquid is formed between the bottom and the lower end of the impregnated element. The impregnation of the element 14 is effected either by means of a wick (not shown) which is immersed in the liquid, or by upending the packaging unit to cause the liquid to be brought into contact with the element 14. This operation is performed quite naturally, in particular when the unit is being carried in a handbag. After having been emptied, the reservoir can be refilled through the opening 24 in the bottom of the compartment 5. According to this embodiment, a foam block 90, impregnated with, for example, water or with any other solvent, is advantageously disposed in the bottom of the compartment 4 so as to humidify the atmosphere in this compartment and to prevent the premature drying out of the stick. The foam block 90 is preferably not in contact with the stick 6.

Figure 2B:
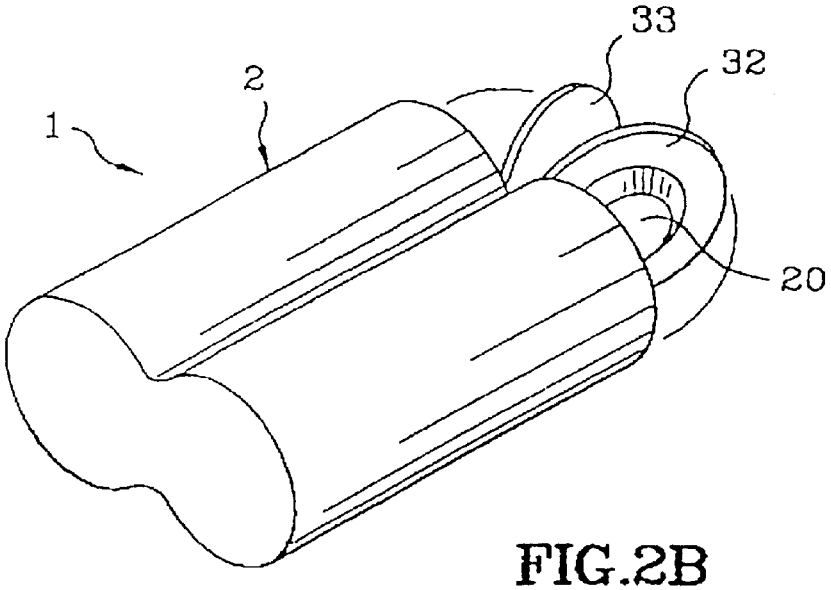

In the embodiment of FIG. 2B, each of the compartments is covered by an individual lid 32, 33. The lid 32 obturates the compartment containing the liquid composition in a leakproof manner by means of the frustoconical part 20 carried by the internal surface of the lid 32. The second lid 33 performs the function of a cover cap for the compartment containing the applicator. The two lids are mounted in an articulated way around one hinge pin situated substantially between the openings of each of the compartments.

Figure 2C:
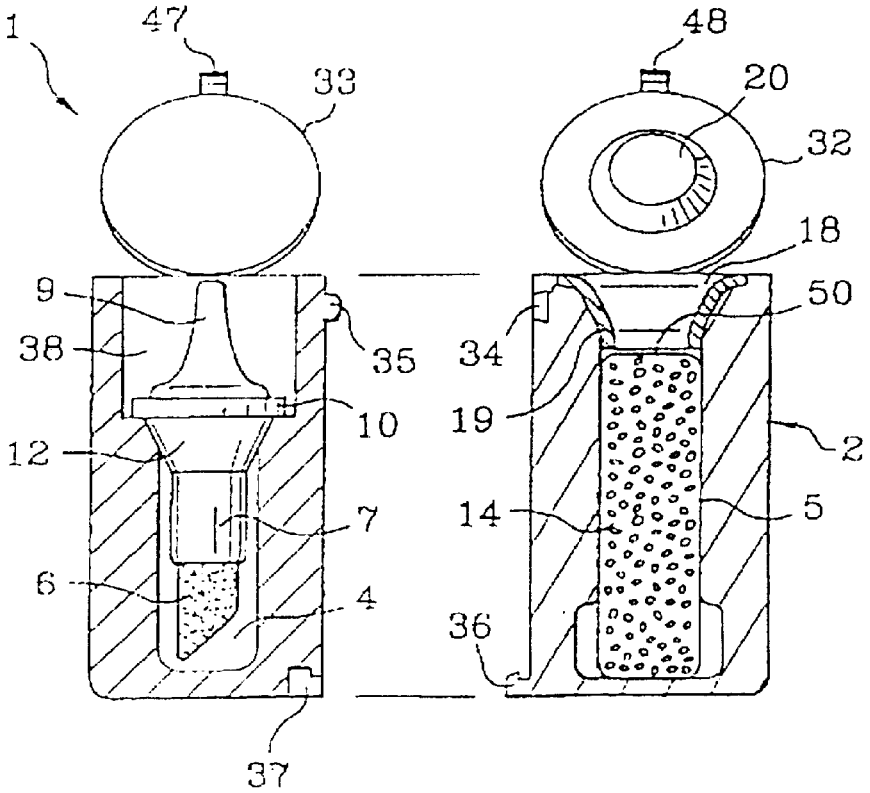

In the embodiment of FIG. 2C, the first compartment is detachably mounted on the second. For this purpose, groove/slide means 34, 35 are provided on the upper portion of the case and are optionally coupled with other fastening means 36, 37 in the bottom portion of the case. In this embodiment, the compartment 5 containing the liquid composition does not have an opening at its bottom. Thus, when the contents of the compartment 5 have been used up, the user separates the compartment 5 from the compartment 4 and replaces it with another. This makes is possible to use a single applicator in combination with different liquid compositions. The other parts of the device are identical with those described with reference to the preceding Figures and therefore do not require any additional detailed description. In the same way as in the embodiment of FIG. 2B, each of the compartments is individually obturated by a lid 32, 33, of which the lid 32 obturates the opening 18 in a leakproof manner and the lid 33 obturates a cavity 38 formed above the compartment 4 and wherein there emerges the gripping element 9 of the applicator 6. The two lids are kept in their closed position by fastening means 47, 48 disposed on the circumference of each of the lids and capable of cooperating with complementary means (not shown) carried by each one of the compartments 4 and 5.

Figure 3A:
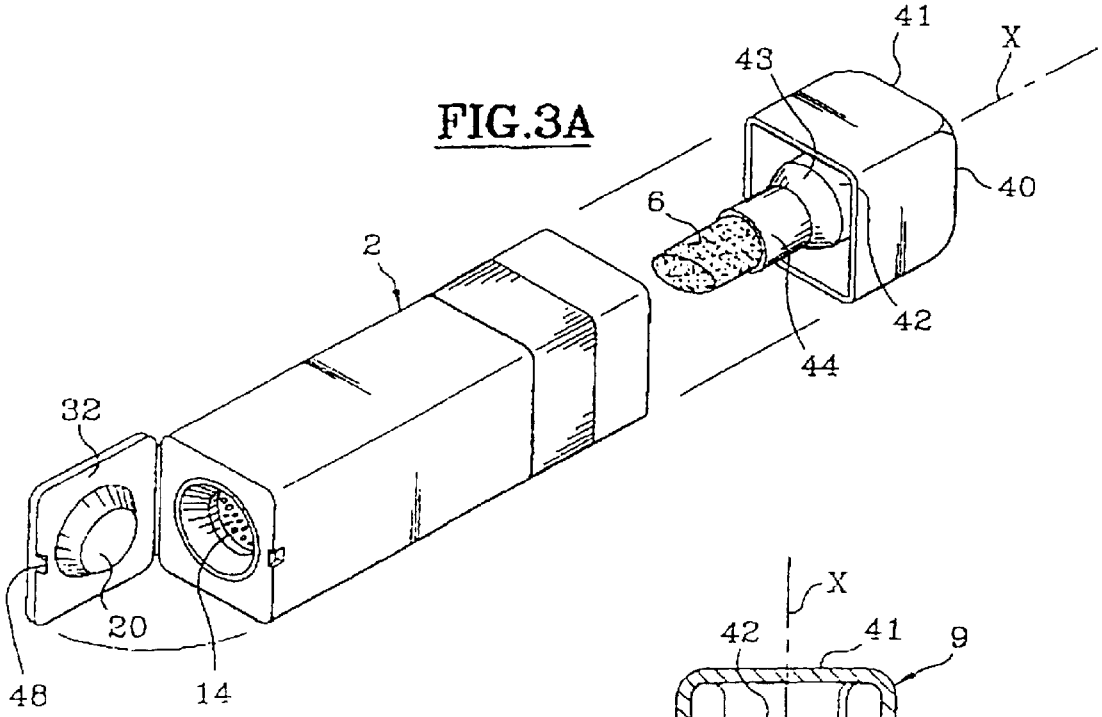
Figure 3B:
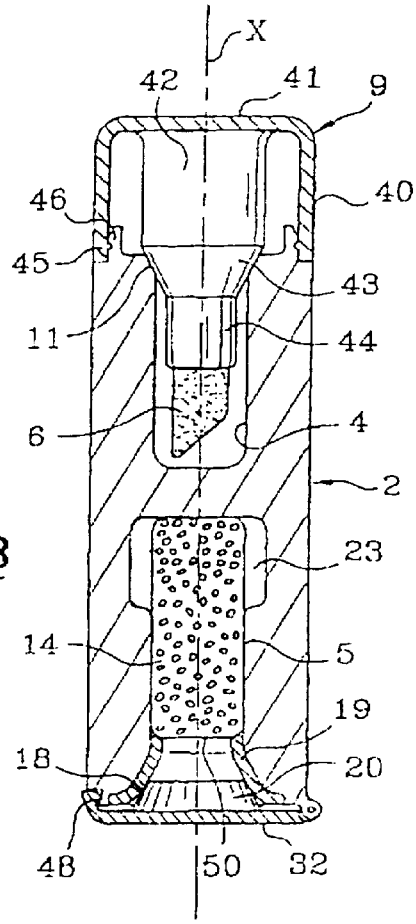

FIGS. 3A and 3B illustrate another embodiment in which the compartments are no longer disposed side-by-side, but head-to-tail. In this embodiment the two compartments 4 and 5 are orientated in directions opposite to one another and are aligned along a single axis X. The opening 11 of the compartment 4 containing the applicator is obturated by the gripping element 9 of the applicator. The gripping element 9 has a lateral skirt 40 with an external cross-section substantially identical with the external cross-section of the case 2 and surmounted by a top side 41. Fastening means 45 are disposed inside the free edge of the lateral skirt 40 so as to cooperate with the complementary fastening means carried by the upper edge of the case 2 for fixing the applicator axially in position in the compartment 4. The internal surface of the top side 41 carries an axial duct 42 extended in a frustoconical portion 43 capable of forming the seal for the opening 11. The frustoconical portion is extended in a skirt 44 with its smaller diameter end forming a cup for the applicator 6. On the opposite side to the element 9, the compartment containing the impregnated element 14 is closed in a leakproof manner by a lid 32 comprising fastening means 48. The other parts of the device are similar to those described above and therefore do not require any additional detailed description.

In the preceding detailed description, reference has been made to preferred embodiments of the invention. It is obvious that variants can be introduced therein without departing from the spirit of the invention such as claimed below.

[What we claim is] *What is claimed is*:

1. An application unit comprising:

a first compartment having a first opening;

an applicator containing a product capable of solubilizing or gelling on a surface in contact with a liquid composition, and mounted in a detachable manner in said first compartment through said first opening;

a second compartment separated from the first compartment and having a second opening;

an impregnated element in said second compartment and impregnated with a liquid composition, said impregnated element being capable of applying a quantity of said liquid composition to the applicator when the applicator is introduced into said second compartment through said second opening and caused to bear on a restoring surface of said impregnated element; and detachable closing means for respectively obturating said first opening and said second opening.

2. An application unit according to claim 1, wherein said impregnated element is formed by at least one of a foam block with at least semi-open cells, a felt wick, a sintered element, and an elastomer of low hardness with at least semi-open cells.

3. An application unit according to claim 1, wherein the restoring surface of said impregnated element is covered by one of a flocked coating, a perforated film of a thermoplastic elastomer, a plastic, a layer of felt, and a textile fabric.

4. An application unit according to claim 1, wherein the liquid composition is substantially wholly contained inside said impregnated element.

5. An application unit according to claim 1, wherein said impregnated element has a first end in the vicinity of said second opening and a second end on an opposite side to the first end, and wherein said impregnated element has, at least at said first end, a cross-section substantially identical with an internal cross-section of the second compartment.

6. An application unit according to claim 5, wherein said second compartment has a bottom, said second end being substantially in contact with said bottom.

7. An application unit according to claim 6, wherein in a vicinity of said bottom, the second compartment defines all around said impregnated element an annular space defining a volume capable of containing a reserve of said liquid composition for feeding said impregnated element, said impregnated element being capable of drawing up said liquid composition from the reserve.

8. An application unit according to claim 5, wherein the second end is situated in a fixed intermediate position between *a* bottom *of the second compartment* and said second opening, so as to define, between the bottom and the said second end, a volume capable of containing a reserve of said liquid composition for feeding said impregnated element, said impregnated element being capable of drawing up said liquid composition from said reserve.

9. An application unit according to claim 1, wherein said applicator is one of a styptic pencil, a stick of lipstick, a make-up foundation, polyvinyl alcohol (PVA), guar gum, and a skin treatment product.

10. An application unit according to *claim* 1, wherein the liquid composition contains at least one of water, any other solvent, preservatives, film-forming elements, emollients, and active compounds.

11. An application unit according to claim 1, including means for detachably mounting the second compartment relative to the first compartment.

12. An application unit according to claim 1, wherein said first and second compartments are aligned along a single axis and are disposed so that said first and second openings are situated in opposite directions to one another.

13. An application unit according to claim 1, wherein the second compartment has an auxiliary opening on an opposite side to said second opening for replacing said impregnated element or for allowing said second compartment to be refilled with the liquid composition, further comprising detachable means for sealingly obturating said auxiliary opening.

14. An application unit according to claim 1, wherein said applicator includes a gripping element providing a leakproof seal of said first opening.

15. An application unit according to claim 14, wherein the gripping element has a frustoconical portion cooperable with a complementary profile of said first opening.

16. An application unit according to claim 14, wherein said gripping element has means for limiting a degree of insertion of the applicator into the second compartment.

17. An application unit according to claim 14, wherein said applicator is disposed in a cup carried by said gripping element, and wherein said applicator is formed by molding or extrusion.

18. An application unit according to claim 1, wherein said detachable closing means comprises a detachable cap carrying a frustoconical element, wherein said second opening is sealingly obturated by said frustoconical element cooperating with a complementary profile of said second opening.

19. An application unit according to claim 18, including a sealing element disposed inside said second opening, said sealing element being disposed so as to prevent the emergence of said impregnated element through said second opening.

20. An application unit according to claim 1, wherein said applicator has a cross-section which is one of circular, triangular, square, oval, and elliptical.

21. An application unit according to claim 1, further comprising, in the bottom of the first compartment, an element which is not in contact with the applicator and which is impregnated with a humidifying liquid.

*22. An application unit comprising:*

*a first compartment having a first opening;*

*an applicator comprising a product having a surface capable of solubilizing or gelling when placed in contact with a liquid composition, the applicator being configured to be removably disposed in the first compartment through the first opening;*

*a second compartment separated from the first compartment and having a second opening; and*

*an impregnatable element in said second compartment, the impregnatable element being configured to be impregnated with a liquid composition, the impregnatable element being capable of applying a quantity of the liquid composition to the applicator when the applicator is introduced into the second compartment through the second opening and placed in contact with a surface of the impregnatable element.*

*23. The application unit of claim 22, wherein the applicator comprises a portion configured to provide a removable closure for the first opening.*

*24. The application unit of claim 22, further comprising a removable closure for at least the second opening.*

*25. The application unit of claim 24, further comprising a movable lid, wherein the removable closure for at least the second opening is associated with the movable lid.*

*26. The application unit of claim 22, wherein the impregnatable element comprises at least one of a foam block with at least semi-open cells, a felt wick, a sintered element, and an elastomer of low hardness with at least semi-open cells.*

*27. The application unit of claim 22, wherein the surface of the impregnatable element is covered by one of a flocked coating, a perforated film of a thermoplastic elastomer, a plastic, a layer of felt, and a textile fabric.*

*28. The application unit of claim 22, further comprising liquid composition contained in the second compartment.*

*29. The application unit of claim 28, wherein the liquid composition is substantially wholly contained inside the impregnatable element.*

*30. The application unit of claim 22, wherein the impregnatable element has first and second opposite ends, the first end of the impregnatable element being closer than the second end of the impregnatable element to the second opening, and wherein at least the first end of the impregnatable element has a cross-section substantially identical to an internal cross-section of the second compartment.*

*31. The application unit of claim 30, wherein the second compartment has a bottom, the second end of the impregnatable element being substantially in contact with the bottom of the second compartment.*

*32. The application unit of claim 22, wherein the second compartment has a bottom, and wherein in a vicinity of the bottom of the second compartment, the second compartment defines adjacent to the impregnatable element a space capable of containing a reserve of the liquid composition for the impregnatable element, the impregnatable element being capable of drawing up the liquid composition from the reserve.*

*33. The application unit of claim 30, wherein the second end is located in a fixed intermediate position between a bottom of the second compartment and the second opening, so as to define, between the bottom and the second end, a volume capable of containing a reserve of the liquid composition for the impregnatable element, the impregnatable element being capable of drawing up the liquid composition from the reserve.*

*34. The application unit of claim 22, wherein the product is chosen from a styptic pencil, a stick of lipstick, a make-up foundation, polyvinyl alcohol (PVA), guar gum, and a skin treatment product.*

*35. The application unit of claim 28, wherein the liquid composition comprises at least one of water, any other solvent, preservatives, film-forming elements, emollients, and active compounds.*

*36. The application unit of claim 22, wherein the first compartment and the second compartment are detachably mounted together.*

*37. The application unit of claim 22, wherein the first compartment and the second compartment are disposed so that said first and second openings face in opposite directions to one another.*

*38. The application unit of claim 22, wherein the second compartment has an auxiliary opening on an opposite side to the second opening for at least one of replacing the impregnatable element and allowing the second compartment to be filled with the liquid composition, and wherein the application unit further comprises detachable means for sealingly obturating the auxiliary opening.*

*39. The application unit of claim 22, wherein the applicator includes a gripping element providing a leakproof seal for the first opening.*

*40. The application unit of claim 39, wherein the gripping element has a frustoconical portion cooperable with a complementary profile of the first opening.*

*41. The application unit of claim 39, wherein the gripping element is configured to limit a degree of insertion of the applicator into the second compartment.*

*42. The application unit of claim 22, wherein the applicator includes a cup containing the product, and a gripping element on the cup.*

*43. The application unit of claim 42, wherein the cup and the gripping element are formed by one of molding and extrusion.*

*44. The application unit of claim 22, further comprising a detachable cap including a sealing element configured to seal the second opening.*

*45. The application unit of claim 22, further comprising an element in the second compartment configured to prevent passage of the impregnatable element through the second opening.*

*46. The application unit of claim 22, wherein the product has a cross-section chosen from circular, triangular, square, oval, and elliptical.*

*47. The application unit of claim 22, further comprising, in the first compartment, an element impregnated with a humidifying liquid.*

*48. The application unit of claim 22, wherein the first compartment and the second compartment are defined in a case formed of a unitary piece of material.*

*49. The application unit of claim 22, wherein the second compartment has an auxiliary opening and wherein the application unit further comprises a lid covering the auxiliary opening.*

*50. The application unit of claim 49, wherein the second opening is at a first end of the second compartment and the*

*auxiliary opening is at a second end of the second compartment opposite to the first end.*

*51. The application unit of claim 22, wherein the impregnatable element comprises compressible material, and wherein the applicator is configured to compress the impregnatable element when the applicator is introduced into the second compartment.*

*52. The application unit of claim 22, wherein the impregnatable element is configured to retain the liquid composition in the second compartment.*

*53. An application unit comprising:*

*a first compartment having a first opening;*

*a second compartment separated from the first compartment and having a second opening, the second compartment being configured to contain a liquid composition; and*

*an applicator comprising a product having a surface capable of solubilizing or gelling when placed in contact with the liquid composition, the applicator being configured to be removably disposed in the first compartment through the first opening, and the applicator being configured to be removably disposed in the second compartment through the second opening.*

*54. The application unit of claim 53, further comprising an impregnatable element in the second compartment, the impregnatable element being configured to be impregnated with the liquid composition.*

*55. The application unit of claim 54, wherein the impregnatable element is capable of applying a quantity of the liquid composition to the applicator when the applicator is introduced into the second compartment through the second opening.*

*56. The application unit of claim 53, wherein the applicator comprises a portion configured to provide a removable closure for the first opening.*

*57. The application unit of claim 53, further comprising a removable closure for at least the second opening.*

*58. The application unit of claim 57, further comprising a movable lid, wherein the removable closure for at least the second opening is associated with the movable lid.*

*59. The application unit of claim 54, wherein the impregnatable element comprises at least one of a foam block with at least semi-open cells, a felt wick, a sintered element, and an elastomer of low hardness with at least semi-open cells.*

*60. The application unit of claim 53, further comprising liquid composition contained in the second compartment.*

*61. The application unit of claim 60, further comprising an impregnatable element, wherein the liquid composition is substantially wholly contained inside the impregnatable element.*

*62. The application unit of claim 53, wherein the product is chosen from a styptic pencil, a stick of lipstick, a make-up foundation, polyvinyl alcohol (PVA), guar gum, and a skin treatment product.*

*63. The application unit of claim 60, wherein the liquid composition comprises at least one of water, any other solvent, preservatives, film-forming elements, emollients, and active compounds.*

*64. The application unit of claim 53, wherein the first compartment and the second compartment are detachably mounted together.*

*65. The application unit of claim 53, wherein the first compartment and the second compartment are disposed so that the first and second openings face in opposite directions to one another.*

*66. The application unit of claim 53, wherein the first and second openings face in the same direction.*

*67. The application unit of claim 53, wherein the second compartment has an auxiliary opening for allowing the second compartment to be filled with the liquid composition.*

*68. The application unit of claim 53, wherein the applicator includes a gripping element providing a leakproof seal for the first opening.*

*69. The application unit of claim 68, wherein the gripping element is configured to limit a degree of insertion of the applicator into the second compartment.*

*70. The application unit of claim 53, wherein the applicator includes a cup containing the product, and a gripping element on the cup.*

*71. The application unit of claim 53, further comprising a detachable cap including a sealing element configured to seal the second opening.*

*72. The application unit of claim 53, further comprising, in the first compartment, an element impregnated with a humidifying liquid.*

*73. The application unit of claim 53, wherein the first compartment and the second compartment are defined in a case formed of a unitary piece of material.*

*74. The application unit of claim 53, wherein the second compartment has an auxiliary opening and wherein the application unit further comprises a lid covering the auxiliary opening.*

*75. The application unit of claim 74, wherein the second opening is at a first end of the second compartment and the auxiliary opening is at a second end of the second compartment opposite to the first end.*

* * * * *